United States Patent [19]

Tsumaki et al.

[11] Patent Number: 4,475,462

[45] Date of Patent: Oct. 9, 1984

[54] TILTABLE HANGER APPARATUS

[75] Inventors: Masahiro Tsumaki; Toshihiko Fujii; Hideaki Kamiya; Haruo Suzuki; Yoshihiro Goto, all of Zama, Japan

[73] Assignee: Nissan Motor Company, Limited, Yokohama, Japan

[21] Appl. No.: 350,197

[22] Filed: Feb. 19, 1982

[30] Foreign Application Priority Data

Mar. 19, 1981 [JP] Japan ............................ 56-39920

[51] Int. Cl.³ ........................................ B61B 3/00

[52] U.S. Cl. ........................... 105/149; 104/89; 198/680; 198/798

[58] Field of Search ............... 105/148, 149, 154, 155; 104/89, 94, 95, 172 S; 198/680, 798, 800

[56] References Cited

U.S. PATENT DOCUMENTS

| | | | |
|---|---|---|---|
| 4,341,161 | 7/1982 | Morita et al. | 105/149 |
| 4,408,539 | 10/1983 | Wakabayashi | 104/89 |

FOREIGN PATENT DOCUMENTS

| | | | |
|---|---|---|---|
| 1809224 | 12/1969 | Fed. Rep. of Germany | 198/680 |
| 110579 | 8/1979 | Japan | 104/89 |
| 120178 | 9/1979 | Japan | 104/89 |
| 38393 | 11/1979 | Japan . | |
| 615002 | 7/1978 | U.S.S.R. | 198/798 |
| 673549 | 7/1979 | U.S.S.R. | 104/89 |

*Primary Examiner*—Randolph Reese

*Attorney, Agent, or Firm*—Lane, Aitken & Kananen

[57] ABSTRACT

Herein disclosed is a tiltable hanger apparatus including an overhead track assembly and a work-carrying assembly movable below and along the overhead track assembly. The work-carrying assembly is composed of a main carrier frame suspended from the overhead track assembly, an auxiliary carrier frame supported by the main carrier frame and arranged to be tiltable with respect to the main carrier frame in a fore-and-aft direction of the work-carrying assembly, and a hanger frame supported by the auxiliary carrier frame and angularly movable with respect to the auxiliary carrier frame about an axis normal to a plane perpendicular to the fore-and-aft direction of the work-carrying assembly. The auxiliary carrier frame is caused to tilt with respect to the main carrier frame in a fore-and-aft direction of the work-carrying assembly by the aid of a first set of guide rollers and rails. The hanger frame is held in engagement with a second set of guide rollers and rails arranged to cause the hanger frame to angularly turn with respect to the auxiliary carrier frame about the aforesaid axis.

2 Claims, 3 Drawing Figures

1
2
3
4
4'
8
8'
6
7
11
11'
10
10'
15
5
9
14
12
13
16
17
21
22
B
20
18
19
S
S'
20'
19'
18'
22'
16'
17
21'
23
23'

TILTABLE HANGER APPARATUS

FIELD OF THE INVENTION

The present invention relates to a tiltable hanger apparatus for use in an assembly line of works such as body structures of automotive vehicles.

SUMMARY OF THE INVENTION

In accordance with the present invention, there is provided a tiltable hanger apparatus comprising, in combination, a continuously extending overhead track assembly, a work-carrying assembly, and first and second guide means. The work-carrying assembly is movable below and along the overhead track assembly and has a fore-and-aft direction substantially parallel with the overhead track assembly. The work-carrying assembly comprises (a) a main carrier frame suspended from the overhead track assembly and having a predetermined attitude below and with respect to the overhead track assembly, (b) an auxiliary carrier frame supported in weight transmitting relationship by the main carrier frame and arranged to be tiltable with respect to the main carrier frame in a fore-and-aft direction of the work-carrying assembly, and (c) a hanger frame supported in weight transmitting relationship by the auxiliary carrier frame and angularly movable in its entirety with respect to the auxiliary carrier frame about an axis fixed with respect to the auxiliary carrier frame and substantially normal to a plane perpendicular to the fore-and-aft direction of the work-carrying assembly. The hanger frame has portions adapted to have a work supported thereon. The first guide means are arranged to cause the auxiliary carrier frame to tilt with respect to the main carrier frame in a fore-and-aft direction of the work-carrying assembly, and the second guide means are engaged by the hanger frame and are arranged to cause the hanger frame to angularly turn with respect to the auxiliary carrier frame about aforesaid axis. The first guide means in the hanger apparatus thus constructed may comprise at least two guide rails each partially extending in parallel with the overhead track assembly and partially slanting vertically. At least one guide roller is carried by the auxiliary carrier frame in the neighborhood of one longitudinal end of the auxiliary carrier frame and engageable with one of the guide rails, and at least one guide roller is carried by the auxiliary carrier frame in the neighborhood of the other longitudinal end of the auxiliary carrier frame and engageable with the other of the guide rails. Each of the guide rollers is rotatable on each of the guide rails about an axis fixed with respect to the auxiliary carrier frame in a lateral direction of the work-carrying assembly. On the other hand, the second guide means of the hanger apparatus according to the present invention may comprise two guide rails spaced apart in parallel from each other along the overhead track assembly and longitudinally extending below the hanger frame. Each of the guide rails of the second guide means has a longitudinal portion vertically curved in such a manner as to have a predetermined distance from the aforesaid axis, and a pair of guide rollers carried on the hanger frame and held in rollable engagement with the guide rails, respectively, of the second guide means. Each of the guide rollers of the second guide means is rotatable on each of the guide rails of the second guide means about an axis fixed with respect to the hanger frame in a lateral direction of the work-carrying assembly.

BRIEF DESCRIPTION OF THE DRAWINGS

Drawbacks of a prior-art hanger apparatus of the nature to which the present invention appertains and further details of a tiltable hanger apparatus according to the present invention will be understood from the following description taken in conjunction with the accompanying drawings, in which.

DESCRIPTION OF THE PRIOR ART

Figure 1:
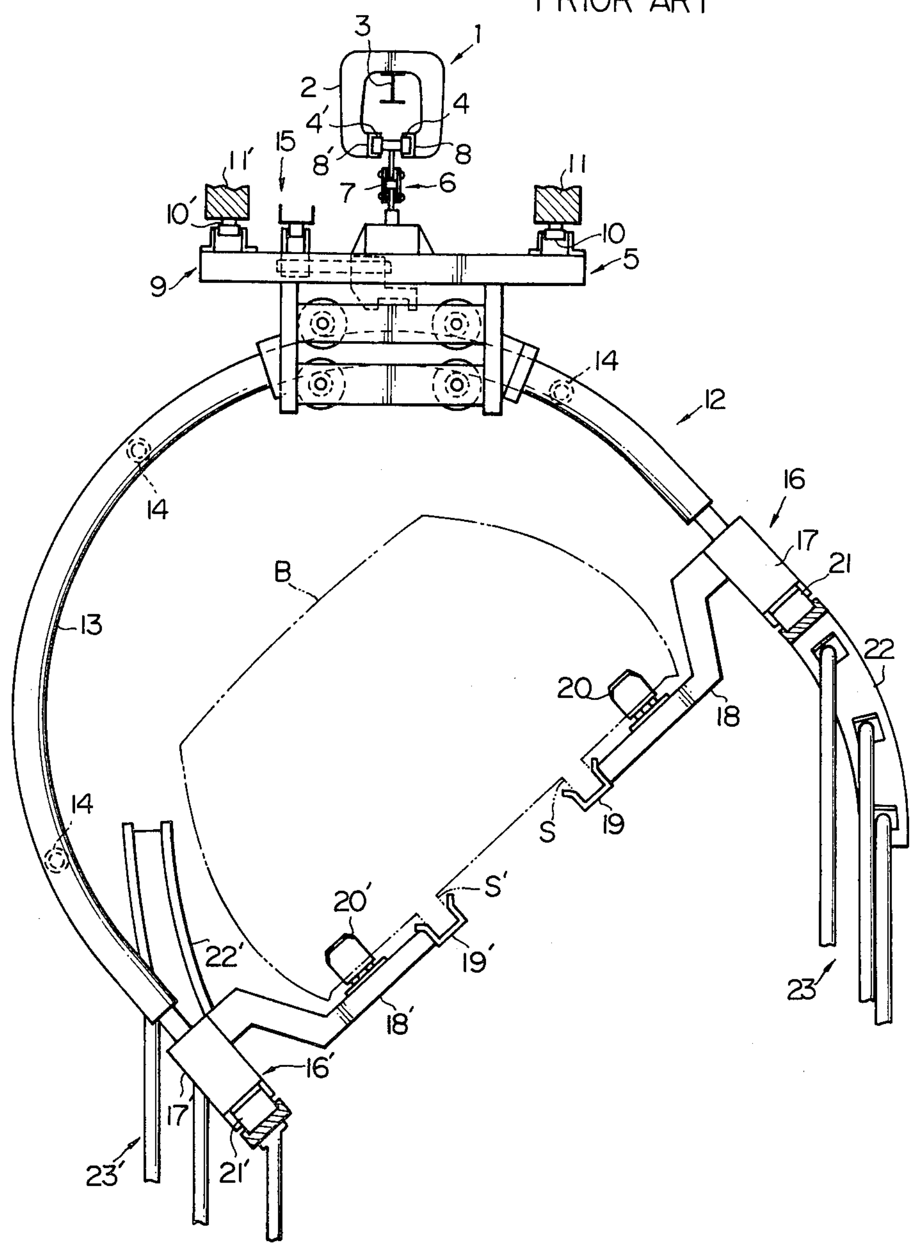
FIG. 1 is a front end view showing partially in cross section the general construction and arrangement of a prior-art hanger apparatus for handling body structures of automotive vehicles.

An example of a prior-art hanger apparatus of the nature to which the present invention appertains is taught in Japanese Patent Publication No. 54-38393. As shown in FIG. 1 of the drawings, the hanger apparatus therein disclosed is provided in combination with an overhead track assembly 1 including a series of rail support members 2 disposed at suitable intervals from each other, an upper guide rail 3 secured to the rail support members 2, and a pair of lower guide rails 4 and 4' also secured to the support members 2. The lower guide rails 4 and 4' extend in parallel with the upper guide rail 3 and are horizontally spaced apart from each other below the guide rail 3. The track assembly 1 is usually arranged to slope upwardly or downwardly from one end of the track assembly 1 to the other so as to smoothly intervene between the precedent and subsequent assembly lines, as is well known in the art. A work-carrying assembly 5 is movable below and along the track assembly 1 and includes usually two trolley units 6 which are disposed at a spacing from each other in a direction parallel with the track assembly 1 although only one of such units is herein shown. Each of the trolley units 6 has a trolley carriage 7 having carried thereon rollers 8 arranged to roll on the lower guide rails 4 and 4', respectively. The carriage 7 of each of the trolley units 6 is operatively connected to a drive unit (not shown) supported on and movable along the upper guide rail 3. The carriages 7 of the trolley units 6 have suspended therefrom a carrier frame 9 which is thus movable with the trolley units 6 along the lower guide rails 4 and 4'. The carrier frame 9 has rollers 10 and 10' carried by bracket members on the upper face of the frame 9. The rollers 10 and 10' are held in rollable engagement with the lower faces of stationary levelling rails 11 and 11', respectively, extending in parallel with the track assembly 1 and horizontally spaced apart from each other. When the above mentioned drive unit on the upper guide rail 3 is in operation and accordingly the trolley units 6 and 6' and the carrier frame 9 are driven to move along the lower guide rails 4 and 4', the rollers 10 and 10' on the carrier frame 9 are caused to roll on the lower faces of these levelling rails 11 and 11', respectively.

The work-carrying assembly 5 further includes a hanger frame 12 composed of a pair of generally semicircularly curved, tubular bow members 13 and a plurality of longitudinal connecting bars 14. The bow members 13, only one of which is herein shown, are spaced apart from each other in a direction parallel with the overhead track assembly 1 and are semicircularly curved with a predetermined radius of curvature about an axis fixed in the work-carrying assembly 5 and parallel with the track assembly 1. On the other hand, the connecting bars 14 extend in parallel with the track assembly 1 and connect the bow members 13 together. The hanger frame 12 thus constructed is angularly movable with respect to the carrier frame 9 about the above mentioned axis and is suspended from the carrier frame 9 by means of four pairs of retaining rollers carried on the carrier frame 9. These retaining rollers are arranged so that each of the bow members 13 of the hanger frame 12 has an arcuate portion movably interposed between a pair of upper retaining rollers and a pair of lower retaining rollers 16, although the rollers associated with only one of the bow members 13 are herein shown. The carrier frame 9 has mounted thereon a locking assembly 15 engageable with the longitudinally intermediate portion of the intermediate connecting bars 14 when the hanger frame 12 is to be held in an angular position with respect to the aforesaid axis about which the hanger frame 12 as a whole is angularly movable.

The hanger frame 12 has its opposite end portions coupled to two pairs of holder arm assemblies adapted to have supported thereon a workpiece such as a vehicle body structure B to be handled by the hanger apparatus. The two pairs of arm holder assemblies consist of a pair of holder arm assemblies 16 and 16' connected to one of the two bow members 13 of the hanger frame 12 so as to engage the vehicle body structure B in the vicinity of one longitudinal end of the body structure B and a pair of arm holder assemblies (not shown) connected to the other of the bow members 13 so as to engage the vehicle body structure B in the vicinity of the other longitudinal end of the body structure B. The holder arm assemblies 16 and 16' include cylindrical support blocks 17 and 17' extending from the opposite ends, respectively, of the bow member 13, and holder arms 18 and 18' projecting from the support blocks 17 and 17', respectively, toward each other. The holder arms 18 and 18' have fixedly attached thereto holding members 19 and 19', respectively, each having a generally U-shaped cross section. The holding members 19 and 19' are adapted to be held in retaining engagement with suitable downwardly protruding lower structural portions or members such as the front side members S and S', respectively, of the vehicle body structure B. The holder arms 18 and 18' are further provided with locking devices 20 and 20', respectively, adapted to be held in locking engagement with other suitable structural portions or members of the vehicle body structure B so as to assure that the vehicle body structure B is supported by the holder arms 18 and 18' with certainty throughout operation of the hanger apparatus.

The cylindrical support blocks 17 and 17' have carried thereon guide rollers 21 and 21' which are arranged to roll on and along guide rails 22 and 22', respectively. The guide rails 22 and 22' are supported on upright supporting posts 23 and 23' and are curved at a fixed distance from the axis about which the hanger frame 12 is angularly movable and are spaced apart from each other at a fixed distance.

The prior-art hanger apparatus has a drawback in that the hanger frame 12 and accordingly the vehicle body structure B supported by the holder arms 18 and 18' are permitted to tilt merely about the previously mentioned axis and are thus not enabled to tilt longitudinally. Since the vehicle body structure B on the holder arms 18 and 18' can not be inclined upwardly or downwardly in a forward or backward direction above the floor surface, difficulties are experienced with an operator's access to the lower structural portions and members of the vehicle body structure B when such portions and members are to be welded, bolted or otherwise worked on to make the vehicle body complete. Because, furthermore, of the fact that the overhead track assembly 1 is usually arranged to slope upwardly or downwardly from one end of the assembly toward the other, the vehicle body structure B carried on the holder arms 18 and 18' is also slightly inclined in a fore-and-aft direction and tends to slide downwardly in a forward or backward direction due to the weight thereof. To preclude such a tendency, the prior-art hanger apparatus of the described general nature must be further provided with extra retaining means adapted to have the vehicle body structure B reliably retained in a predetermined longitudinal position on the holder arms 18 and 18' throughout the travel of the vehicle body structure B along the overhead track assembly 1. Provision of such extra retaining means not only results in added intricacy of the assembly line but also gives rise to an increase of the production costs of the automotive vehicles to be manufactured.

The present invention contemplates elimination of these drawbacks of conventional tiltable hanger arrangements represented by the above described prior-art hanger apparatus. It is, accordingly, a prime object of the present invention to provide a hanger apparatus characterized by a hanger frame which is enabled to tilt not only about an axis parallel with the path along which the hanger frame is to travel with a workpiece carried thereon but also upwardly or downwardly in a forward direction in which the hanger frame is to travel.

DESCRIPTION OF THE PREFERRED EMBODIMENT

Figure 2:
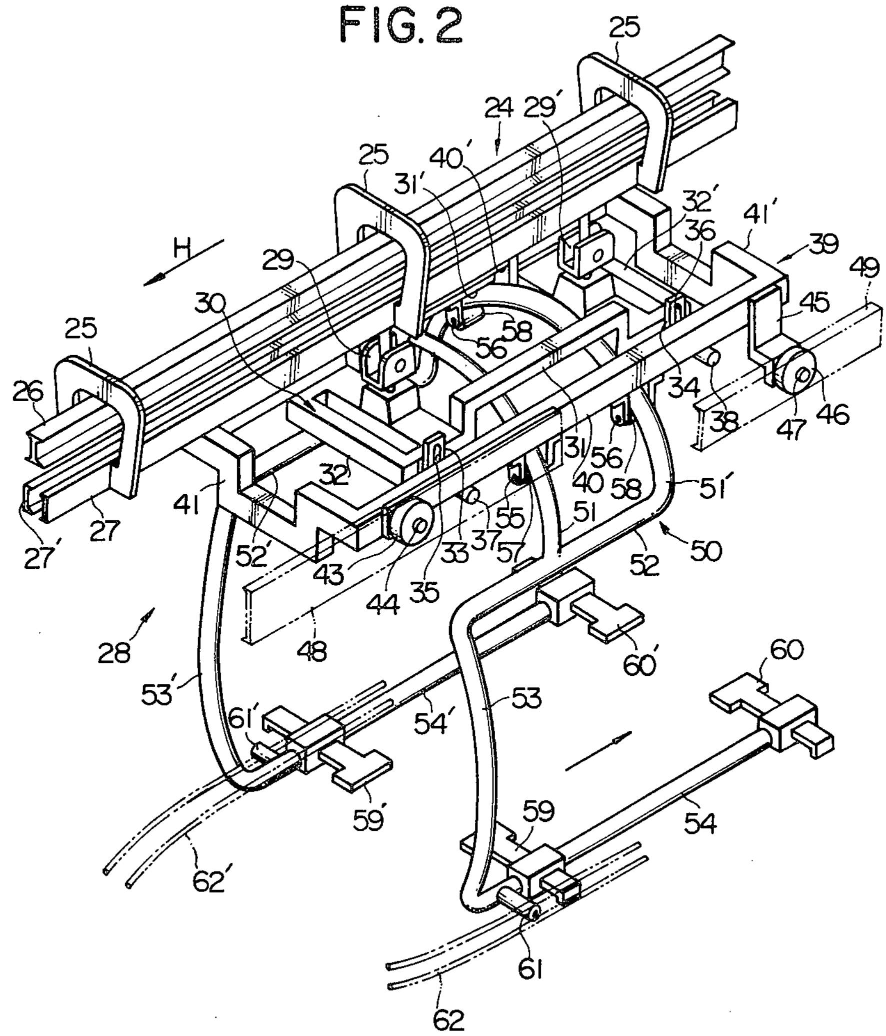
FIG. 2 is a perspective view showing an embodiment of a hanger apparatus according to the present invention.

Referring to FIG. 2 of the drawings, the hanger apparatus embodying the present invention comprises a stationary overhead track assembly 24 including a series of generally horseshoe-shaped rail support members 25 disposed at suitable intervals from each other above a floor surface (not shown), an upper guide rail 26 secured to an upper intermediate portion of each of the rail support members 25, and a pair of lower guide rails 27 and 27' secured to lower end portions, respectively, of each of the rail support members 25. The lower guide rails 27 and 27' extend in parallel with the upper guide rail 26 and are horizontally spaced apart from each other below the upper guide rail 26. The overhead track assembly 24 is usually arranged to slope upwardly or downwardly from one end of the track assembly 24 toward the other so as to smoothly intervene between the precedent and subsequent assembly lines. Furthermore, the track assembly 24 is herein assumed as extending straight as shown but may be curved partially.

Figure 3:
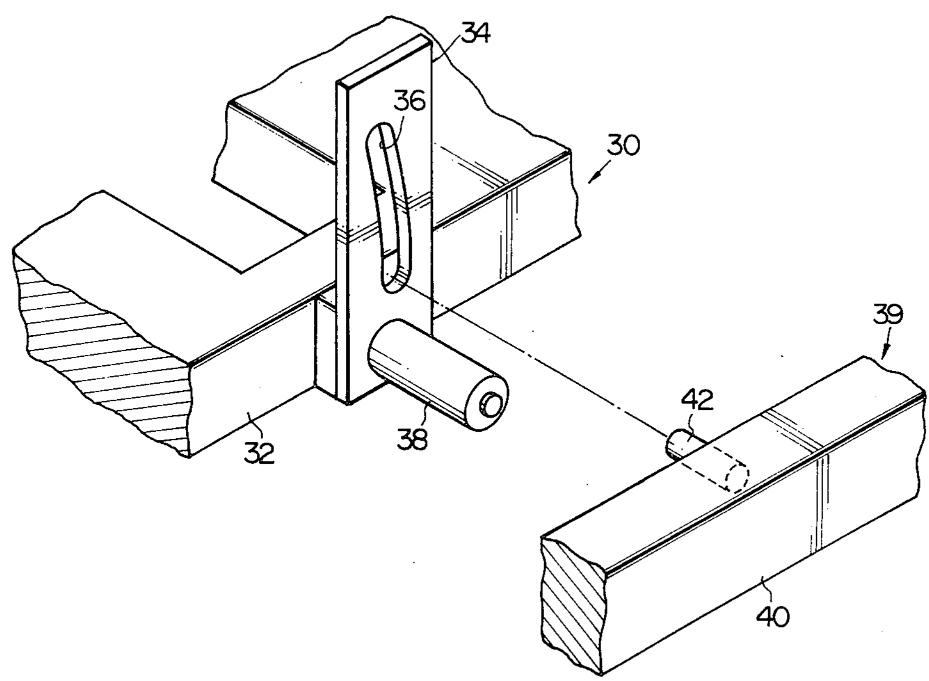
FIG. 3 is a fragmentary perspective view showing, to an enlarged scale, portions of the apparatus shown in FIG. 2.

The hanger apparatus embodying the present invention further comprises a work-carrying assembly 28 which is arranged to be in its entirety movable below and along the overhead track assembly 24. In the embodiment shown in FIG. 2, the work-carrying assembly 28 is driven to move in a direction indicated by arrow H along the above described overhead track assembly 24 and, thus, has a fore-and-aft direction parallel with the overhead track assembly 24. The work-carrying assembly 28 includes two, front and rear trolley units 29 and 29' which are disposed at a spacing from each other in a fore-and-aft direction of the work-carrying assembly 28. Each of the trolley units 29 and 29' has a trolley carriage having carried theron at least two rollers (not shown) arranged to roll on the lower guide rails 27 and 27', respectively. Though not shown, a chain or cable is anchored at one end to the carriage of each of the trolley units 29 and 29' and is operatively connected to a drive unit supported on and movable along the upper guide rail 26. The carriages of the trolley units 29 and 29' have suspended therefrom a main carrier frame 30 which is thus movable with the trolley units 29 and 29' along the lower guide rails 27 and 27'. The main carrier frame 30 largely consists of a pair of side frame portions 31 and 31' longitudinally extending in parallel with the overhead track assembly 24 and spaced apart from each other below the overhead track assembly 24, and a pair of lateral frame portions 32 and 32' bridging the side frame portions 31 and 31' at the front and rear ends, respectively, of the side frame portions 31 and 31'. The front and rear lateral frame portions 32 and 32' are connected to the carriages of the trolley units 29 and 29', respectively, so that the main carrier frame 30 as a whole is suspended from the overhead track assembly 24 through the trolley units 29 and 29' and has a predetermined attitude below and with respect to the overhead track assembly 24. The main carrier frame 30 further has two pairs of vertical guide plates which consist of a pair of front vertical guide plates 33 (only one of which is seen in FIG. 2) securely attached to the outer side faces, respectively, of the front lateral frame portion 32 and a pair of rear vertical guide plates 34 (only one of which is seen in FIG. 2) securely attached to the outer side faces, respectively, of the rear lateral frame portion 32'. The guide plates 33 and 34 extend upwardly above the upper faces of the front and rear lateral frame portions 32 and 32', respectively, and are formed with slightly arcuate slots 35 and 36, respectively, as will be better seen from the illustration of FIG. 3 in connection with the slot 36 formed in one of the guide plates 34. The vertical guide plates 33 and 34 have a pair of front carrier pins 37 and a pair of rear carrier pins 38. The front carrier pins 37 axially project outwardly from the front vertical guide plates 33, respectively, in a lateral direction of the main carrier frame 30 and are axially aligned with each other laterally of the main carrier frame 30. Likewise, the rear carrier pins 38 axially project outwardly from the rear vertical guide plates 34, respectively, in a lateral direction of the main carrier frame 30 and are axially aligned with each other laterally of the main carrier frame 30. The respective slots 35 in the guide plates 33 are aligned with each other laterally of the main carrier frame 30 and are arcuately curved about the pins 38 or, more exactly, the upper ends of the pins 38 on the guide plates 34 for the reason that will be understood as the description proceeds. Likewise, the slots 36 in the guide plates 34 are aligned with each other laterally of the main carrier frame 30 and are arcuately curved about the pins 37 or, more exactly, the upper ends of the pins 37 for the reason that will also be understood later.

The main carrier frame 30 has supported thereon an auxiliary carrier frame 39 which is thus movable with the main carrier frame 30 and accordingly with the trolley units 29 and 29' along the lower guide rails 27 and 27'. The auxiliary carrier frame 39 largely consists of a pair of side frame portions 40 and 40' longitudinally extending in parallel with the overhead track assembly 24 and spaced apart from each other on both sides of the main carrier frame 30, and a pair of lateral frame portions 41 and 41' bridging the side frame portions 40 and 40' at the front and rear ends, respectively, of the side frame portions 40 and 40'. The side frame portions 40 and 40' of the auxiliary carrier frame 39 are spaced apart outwardly from the side frame portions 31 and 31', respectively, of the main carrier frame 30 laterally of the work-carrying assembly 28, and the lateral frame portions 41 and 41' of the auxiliary carrier frame 39 are spaced apart in parallel from the front and rear lateral frame portions 32 and 32', respectively, of the main carrier frame 30 outwardly in a fore-and-aft direction of the work-carrying assembly 28. The side frame portions 40 and 40' of the auxiliary carrier frame 39 rest on the above mentioned carrier pins 37 and 38 projecting from the front and rear vertical guide plates 33 and 34. The auxiliary carrier frame 39 is thus supported in weight transmitting relationship by the main carrier frame 30 and is tiltable with respect to the main carrier frame 30 in a fore-and-aft direction of the work-carrying assembly 28. Furthermore, the side frame portions 40 and 40' of the auxiliary carrier frame 39 have two pairs of guide pins axially projecting from the respective inner faces of the frame portions 40 and 40' in lateral directions of the auxiliary carrier frame 39 and located in conjunction with the guide plates 33 and 34 as will be seen from FIG. 3 in connection with the guide pin 42 projecting from the side frame portion 40. The pair of guide pins (not shown but herein represented by the guide pin 42) located in conjunction with the front vertical guide plates 33 axially extend through the slots 35 in the guide plates 33 and, likewise, the pair of guide pins 42 located in conjunction with the rear vertical guide plates 34 axially extend through the slots 36 in the guide plates 34. Thus, the auxiliary carrier frame 39 as a whole is tiltable upwardly in a rearward direction with respect to the main carrier frame 30 about an axis on the outer peripheral surfaces of the front carrier pins 37 with the rear guide pins 42 upwardly moved in the slots 36 in the rear vertical guide plates 34 or, conversely, upwardly in a forward direction with respect to the main carrier frame 30 about an axis on the outer peripheral surfaces of the rear carrier pins 38 with the front guide pins 42 upwardly moved in the slots 35 in the vertical guide plates 33.

The auxiliary carrier frame 39 has carried on its side frame portions 40 and 40' a pair of front guide rollers 43 (only one of which is seen in FIG. 2) rotatably mounted on shafts 44, respectively, axially projecting outwardly from the side frame portions 40 and 40' in a lateral direction of the auxiliary carrier frame 39 and located in the neighborhood of the front lateral frame portion 41 of the auxiliary carrier frame 39, the shafts 44 of the guide rollers 43 having respective center axes aligned with each other laterally of the auxiliary carrier frame 39. The auxiliary carrier frame 39 further has a pair of crank-shaped bracket members 45 (only one of which is seen in FIG. 2) securely attached to the outer faces of the side frame portions 40 and 40' and located in the neighborhood of the rear lateral frame portion 41' of the auxiliary carrier frame 39 as shown. Each of the crank-shaped bracket members 45 has a lower ledge portion sidewise projecting away from the outer face of each of the side frame portions 40 and 40'. The bracket members 45 have carried on their respective ledge portions rear guide rollers 46, respectively, which are rotatably mounted on shafts 47, respectively, axially projecting outwardly from the ledge portions of the bracket members 45 and 45' in a lateral direction of the auxiliary carrier frame 39. The shafts 47 of the rear guide rollers 46 also have respective center axes aligned with each other laterally of the auxiliary carrier frame 39. As the respective lower ledge portions of the crank-shaped bracket members 45 project away from the outer faces of the side frame portions 40 and 40' as above noted, the rear guide rollers 46 are spaced apart wider from each other in a lateral direction of the work-carrying assembly 28 than the front guide rollers 43 are spaced apart from each other laterally of the work-carrying assembly 28. The front guide rollers 43 are rollably engageable with two series of guide rails which are represented by the guide rail 48 and, likewise, the rear guide rollers 46 are rollably engageable with two series of guide rails which are represented by the guide rail 49. The individual guide rails 48 and 49 extend in parallel with the overhead track assembly 24 when viewed in plan, but are gradually curved upwardly or downwardly in forward directions when viewed in side elevation. In the embodiment herein shown, each of the guide rails 48 and 49 is assumed, by way of example, as being gradually curved upwardly in forward directions, viz., in the direction of the arrow in which the work-carrying assembly 28 is to be driven to travel along the lower guide rails 27 and 27' of the track assembly 24. The guide rollers 43 and 46 and the guide rails 48 and 49 thus arranged constitute first guide means arranged to cause the auxiliary carrier frame 39 to tilt with respect to the main carrier frame 30 in a fore-and-aft direction of the work-carrying assembly 28. The first guide means, viz., the guide rails 48 and 49 are held in position by suitable stationary support members (not shown). If desired, the individual guide rails 48 herein assumed as being discrete from one another may be respectively constituted by portions of a single continuous guide rail and, similarly, the series of guide rails 49 arranged discretely from one another may also be respectively constituted by portions of a single continuous guide rail, though not shown in the drawings.

The hanger apparatus embodying the present invention further comprises a hanger frame 50 having a pair of generally semicircularly curved, tubular bow portions 51 and 51' each having a pair of downwardly directed ends, and a pair of longitudinal connecting bar portions 52 and 52'. The bow portions 51 and 51' are spaced apart from each other in a fore-and-aft direction of the work-carrying assembly 28 and are semicircularly curved with a predetermined radius of curvature about an axis in the hanger frame 50 in a fore-and-aft direction of the work-carrying assembly 28. On the other hand, the connecting bar portions 52 and 52' extend in fore-and-aft directions of the work-carrying assembly 28 and are spaced apart in parallel from each other below the main and auxiliary carrier frames 30 and 39. The bow portions 51 and 51' are connected at their respective lower ends to the connecting bar portions 52 and 52'. The connecting bar portions 52 and 52' have forward extensions merging into leg portions 53 and 53' extending downwardly from the foremost ends of the extensions, respectively. The leg portions 53 and 53' in turn merge into supporting bar portions 54 and 54' rearwardly bent from the lower ends of the leg portions 53 and 53', respectively, and longitudinally extending below and in parallel with the connecting bar portions 52 and 52', respectively, as shown. Each of the side frame portions 40 and 40' of the auxiliary carrier frame 39 has securely attached to the lower face thereof a pair of bracket members 55 located in conjunction with the front bow portion 51 of the hanger frame 50 and a pair of bracket members 56 located in conjunction with the rear bow portion 51' of the hanger frame 50. A guide roller 57 is carried by the bracket members 55 and, similarly, a guide roller 58 is carried by the bracket members 56. The hanger frame 50 is thus provided with a total of four guide rollers 57 and 58 which are rotatable about axes fixed with respect to the hanger frame 50 in fore-and-aft directions of the work-carrying assembly 28. The front bow portion 15 of the hanger frame 50 is received on the guide rollers 57 and, likewise, the rear bow portions 51' of the hanger frame 50 are received on the guide rollers 58. The hanger frame 50 as a whole is, thus, supported in a weight transmitting relationship by the auxiliary carrier frame 39 and is not only tiltable with the auxiliary carrier frame 39 in a fore-and-aft direction of the work-carrying assembly 28, but also is angularly movable with respect to the auxiliary carrier frame 39 and accordingly also to main carrier frame 30 about the above mentioned axis about which the bow portions 51 and 51' of the hanger frame 50 are arcuately curved, viz,, an axis which is approximately normal to a plane perpendicular to the fore-and-aft directions of the work-carrying assembly 28.

The supporting bar portions 54 and 54' of the hanger frame 50 have mounted thereon front work-retaining units 59 and 59' located in the neighborhood of the lower ends of the leg portions 53 and 53', respectively, and rear work-retaining units 60 and 60' located in the neighborhood of the rear ends of the bar portions 54 and 54', respectively, as shown. The work-retaining units 59, 59', 60 and 60' are adapted to be held in retaining engagement with, for example, suitable downwardly protruding lower structural portions or members such as the front side members (not shown) of a vehicle body structure.

The support bar portions 54 and 54' of the hanger frame 50 have further carried thereon guide rollers 61 and 61', respectively, which are rotatable about axes fixed with respect to the hanger frame 50 and aligned with each other in a lateral direction of the work-carrying assembly 28. These guide rollers 61 and 61' are held in rollable engagement with a pair of guide rails 62 and 62', respectively, which are spaced apart in parallel from each other at a fixed distance and each of which curvilinearly extends in such a manner as to have a fixed distance from the previously mentioned axis about which the hanger frame 50 is angularly movable. In this instance, the guide rails 62 and 62' are curved further in such a manner that one of the guide rails has an upwardly slanting ramp portion while the other of the guide rails has a downwardly slanting ramp portion or vice versa. In the hanger apparatus embodying the present invention, the guide rollers 61 and 61' and the guide rails 62 and 62' constitute second guide means with which the hanger frame 50 is held in engagement, the second guide means being arranged to cause the hanger frame 50 to angularly turn with respect to the auxiliary carrier frame 39 about the above mentioned axis.

When, in operation, the work such as the vehicle body (not shown) to be completed is carried on the lower supporting bar portions 54 and 54' of the hanger frame 50 and is held in position with respect to the hanger frame 50 by means of the front and rear work-retaining units 59 and 60 and the front and rear work-retaining units 59' and 60'. At an incipient station of the assembly line, the guide rails 48 and 49 and the guide rails 62 and 62' longitudinally extend in parallel with the overhead track assembly 24. Accordingly, the auxiliary carrier frame 39 is held in position on a plane parallel with the plane on which the main carrier frame 30 is positioned, with the longitudinal side frame portions 40 and 40' of the auxiliary carrier frame 39 supported on the front carrier pins 37 and rear carrier pins 38 of the main carrier frame 30. The distance between the guide rail 62 and the overhead track assembly 24 is held substantially equal to the distance between the guide rail 62' and the overhead track assembly 24. Under these conditions, the vehicle body supported on the supporting bar portions 54 and 54' of the hanger frame 50 assumes an attitude longitudinally parallel with the overhead track assembly 24 above the floor surface.

When, now, the drive unit (not shown) supported on and movable along the upper guide rail 26 of the overhead track assembly 24 is put into operation, the trolley units 29 and 29' and accordingly the work-carrying assembly 28 suspended therefrom are driven to travel along the overhead track assembly 24 forwardly in the direction of the arrow H. As the work-carrying assembly 28 approaches a station in which it is desired that the vehicle body supported by the hanger frame 50 be sidewise inclined for ease of operation to have the lower structural portions or members of the vehicle body welded, bolted or otherwise worked on, one of the guide rails 62 and 62' respectively carrying the guide rollers 61 and 61' of the hanger frame 50 slopes upwardly and the other of the guide rails 62 and 62' slopes downwardly with respect to the overhead track assembly 24. If, in this instance, it is assumed that the guide rail 62 is slanting upwardly and the guide rails 62' is slanting downwardly at this station of the assembly line, it follows that the supporting bar portion 54 is raised and concurrently the supporting bar portion 54' is lowered over the floor surface. The hanger frame 50 as a whole is caused to turn through a certain angle with respect to the main and auxiliary carrier frames 30 and 39 about the axis about which the bow portions 51 and 51' are semicircularly curved. As a result, the vehicle body on the supporting bar portions 54 and 54' of the hanger frame 50 is caused to tilt in a lateral direction so as to provide easy access to the raised-side lower structural portions or members of the vehicle body.

When, on the other hand, the work-carrying assembly 28 approaches a station in which it is desired that the vehicle body supported by the hanger frame 50 be inclined upwardly in a forward direction for ease of operation to have the front lower structural portions or members of the vehicle body welded, bolted or otherwise worked on, the guide rails 48 engaged by the front guide rollers 43 on the auxiliary carrier frame 39 slope upwardly with respect to the overhead track assembly 24. The guide rollers 43 rolling on the upwardly slanting guide rails 48 raise a front end portion of the auxiliary carrier frame 39 above the front carrier pins 37 on the main carrier frame 30, with the result that the auxiliary carrier frame 39 as a whole is caused to tilt upwardly in a forward direction about an axis on the outer peripheral surfaces of the rear carrier pins 38. Under these conditions, the front guide pins 42 are moved upwardly through the slots 35 in the front vertical guide plates 33 but are respectively held in engagement with the guide plates 33 through the slots 35, and the auxiliary carrier frame 39 and accordingly the hanger frame 50 can not be disassembled from the main carrier frame 30. When, on the contrary, the work-carrying assembly 28 approaches a station in which it is desired that the vehicle body supported by the hanger frame 50 be inclined downwardly in a forward direction for ease of operation to have the rear lower structural portions or members of the vehicle body welded, bolted or otherwise worked on, the guide rails 49 engaged by the rear guide rollers 46 on the auxiliary carrier frame 39 slope downwardly with respect to the overhead track assembly 24. The guide rollers 46 rolling on the upwardly slanting guide rails 49 raise a rear end portion of the auxiliary carrier frame 39 above the rear carrier pins 38 on the main carrier frame 30, with the result that the auxiliary carrier frame 39 as a whole is caused to tilt downwardly in a forward direction about an axis on the outer peripheral surfaces of the front carrier pins 37. Under these conditions, the rear guide pins 42 are moved upwardly through the slots 36 in the rear vertical guide plates 34 but are respectively held in engagement with the guide plates 34 through the slots 36, and the auxiliary carrier frame 39 and accordingly the hanger frame 50 can not be disassembled from the main carrier frame 30.

What is claimed is:

1. A tiltable hanger apparatus comprising, in combination, a continuously extending overhead track assembly;

a work-carrying assembly movable below and along the overhead track assembly and having a fore-and-aft direction susbstantially parallel with the overhead track assembly, the work-carrying assembly comprising (a) a main carrier frame suspended from the overhead track assembly and having a predetermined attitude below and with respect to the overhead track assembly, (b) an auxiliary carrier frame disengageably supported in weight transmitting relationship by said main carrier frame and having a longitudinal direction substantially parallel with the fore-and-aft direction of the work-carrying assembly, the auxiliary carrier frame being arranged to be tiltable with respect to the main carrier frame in a fore-and-aft direction of the work-carrying assembly selectively about one of two horizontal axes perpendicular to the longitudinal direction of the auxiliary carrier frame, one of the two horizontal axes being located in the vicinity of one longitudinal end of the main carrier frame and the other of the two horizontal axes being located in the vicinity of the other longitudinal end of the main carrier frame, the longitudinal direction of the auxiliary carrier frame being tiltable with respect to the fore-and-aft direction of the work-carrying assembly as the auxiliary carrier frame tilts selectively about one of said two horizontal axes, and (c) a hanger frame supported in weight transmitting relationship by said auxiliary carrier frame and angularly movable in its entirety with respect to the auxiliary carrier frame about an axis fixed with respect to the auxiliary carrier frame and substantially normal to a plane perpendicular to the longitudinal direction of the auxiliary carrier frame, said hanger frame having portions adapted to have a workpiece supported thereon;

first guide means arranged to cause said auxiliary carrier frame to tilt with respect to said main carrier frame in a fore-and-aft direction of the work-carrying assembly selectively about one of said two horizontal axes; and second guide means with which said hanger frame is held in engagement, the second guide means being arranged to cause said hanger frame to angularly turn with respect to said auxiliary carrier frame about said axis of angular movement of the hanger frame, said overhead track assembly extending in a substantially horizontal direction and said first guide means comprising at least two guide rails each partially extending in parallel with said overhead track assembly and partially slanting vertically with respect to the track assembly, at least one guide roller carried by said auxiliary carrier frame in the neighborhood of one longitudinal end of the auxiliary carrier frame and engageable with one of said guide rails, and at least one guide roller carried by said auxiliary carrier frame in the neighborhood of the other longitudinal end of the auxiliary carrier frame and engageable with the other of said guide rails, each of the guide rollers being rotatable on each of said guide rails about an axis fixed with respect to said auxiliary carrier frame in a lateral direction of said work-carrying assembly, said main frame having at least two carrier members having substantially circular cross sections and extending in lateral directions of said work-carrying assembly, said carrier members consisting of a carrier member located in the neighborhood of one longitudinal end of the main carrier frame and a carrier member located in the neighborhood of the other longitudinal end of the main carrier frame, said auxiliary carrier frame being disengageably supported in weight transmitting relationship on said carrier members and being angularly movable selectively about each of the axes located at the upper ends of the two carrier members and parallel with the center axes of the carrier members, respectively, wherein said main carrier frame has at least two guide plates located in the neighborhood of the opposite longitudinal ends, respectively, of the main carrier frame and each formed with a slot and wherein said auxiliary carrier frame has at least two guide pins extending in lateral directions of the work-carrying assembly and axially extending through said slots, respectively the slot in one of the guide plates is arcuately curved about one of said two horizontal axes and the slot of the other guide plate is arcuately curved about the other of the two axes, said guide pins engaging said main carrier frame substantially in non-weight-transmitting relationship thereto and precluding the auxiliary carrier frame from being disengaged from the main carrier frame while permitting the auxiliary carrier frame to turn about each of said two horizontal axes with respect to the main carrier frame.

2. A tiltable hanger apparatus as set forth in claim 1 in which said second guide means comprises two guide rails spaced apart in parallel from each other along said overhead track assembly and longitudinal extending below said hanger frame, each of the guide rails of the second guide means having a longitudinal portion vertically curved in such a manner as to have a predetermined distance from said axis of angular movement of the hanger frame, and a pair of guide rollers carried on said hanger frame and held in rollable engagement with said guide rails, respectively, of the second guide means, each of the guide rollers of the second guide means being rotatable on each of said guide rails of the second guide means about an axis fixed with respect to said hanger frame in a lateral direction of said work-carrying assembly.

* * * * *